United States Patent
Armstrong et al.

(10) Patent No.: US 7,546,406 B2
(45) Date of Patent: Jun. 9, 2009

(54) VIRTUALIZATION OF A GLOBAL INTERRUPT QUEUE

(75) Inventors: William Joseph Armstrong, Rochester, MN (US); David Anthony Larson, Rochester, MN (US); Naresh Nayar, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/781,085

(22) Filed: Jul. 20, 2007

(65) Prior Publication Data

US 2008/0015712 A1 Jan. 17, 2008

Related U.S. Application Data

(63) Continuation of application No. 10/422,513, filed on Apr. 24, 2003, now Pat. No. 7,281,075.

(51) Int. Cl.
*G06F 13/24* (2006.01)

(52) U.S. Cl. .................. 710/267; 710/260; 718/102; 718/105

(58) Field of Classification Search ........... 710/267, 710/260; 718/102, 105
See application file for complete search history.

(56) References Cited

U.S. PATENT DOCUMENTS

| | | | |
|---|---|---|---|
| 4,135,240 A | | 1/1979 | Ritchie |
| 4,245,306 A | * | 1/1981 | Besemer et al. ............. 709/245 |
| 4,400,769 A | | 8/1983 | Kaneda et al. |
| 4,742,447 A | | 5/1988 | Duvall et al. |
| 4,843,541 A | | 6/1989 | Bean et al. |
| 4,860,190 A | * | 8/1989 | Kaneda et al. ................ 710/49 |
| 4,885,681 A | | 12/1989 | Umeno et al. |
| 4,959,781 A | * | 9/1990 | Rubinstein et al. .......... 710/262 |
| 5,095,427 A | * | 3/1992 | Tanaka et al. ................. 718/1 |
| 5,187,802 A | | 2/1993 | Inoue et al. |
| 5,222,215 A | | 6/1993 | Chou et al. |
| 5,301,324 A | * | 4/1994 | Dewey et al. ............... 718/105 |

(Continued)

FOREIGN PATENT DOCUMENTS

JP 01-093830 4/1989

(Continued)

OTHER PUBLICATIONS

Hewlett-Packard Development Company. Security Overview of the Integrity Virtual Machines Architecture. V1.0. Oct. 2007.*

(Continued)

*Primary Examiner*—Mark Rinehart
*Assistant Examiner*—Matthew D Spittle
(74) *Attorney, Agent, or Firm*—Patterson & Sheridan, LLP (57) ABSTRACT

A method, system, and article of manufacture for processing virtual interrupts in a logically partitioned system are provided. An intelligent virtual global interrupt queue (virtual GIQ) that may be associated with a plurality of virtual processors running in a logical partition may be utilized. Upon receiving a virtual interrupt, the virtual GIQ may examine the operating states of the associated virtual processors. In an effort to ensure the virtual interrupt is processed as quickly as possible, the virtual GIQ may present the virtual interrupt to one of the associated virtual processors determined to be in an operating state best suited for processing the virtual interrupt.

9 Claims, 5 Drawing Sheets

U.S. PATENT DOCUMENTS

| | | | |
|---|---|---|---|
| 5,325,525 | A | 6/1994 | Shan et al. |
| 5,325,526 | A | 6/1994 | Cameron et al. |
| 5,357,632 | A | 10/1994 | Pian et al. |
| 5,361,375 | A * | 11/1994 | Ogi .............................. 718/1 |
| 5,404,563 | A | 4/1995 | Green et al. |
| 5,481,747 | A | 1/1996 | Kametani |
| 5,504,670 | A | 4/1996 | Barth et al. |
| 5,535,321 | A | 7/1996 | Massaro et al. |
| 5,574,914 | A | 11/1996 | Hancock et al. |
| 5,659,786 | A | 8/1997 | George et al. |
| 5,692,193 | A | 11/1997 | Jagannathan et al. |
| 5,694,606 | A | 12/1997 | Pletcher et al. |
| 5,872,963 | A | 2/1999 | Bitar et al. |
| 5,898,855 | A | 4/1999 | Onodera et al. |
| 5,978,830 | A | 11/1999 | Nakaya et al. |
| RE36,462 | E | 12/1999 | Chang et al. |
| 6,078,970 | A | 6/2000 | Nordstrom et al. |
| 6,105,050 | A | 8/2000 | Govindaraju et al. |
| 6,195,676 | B1 | 2/2001 | Spix et al. |
| 6,199,093 | B1 | 3/2001 | Yokoya |
| 6,247,109 | B1 | 6/2001 | Kleinsorge et al. |
| 6,269,391 | B1 | 7/2001 | Gillespie |
| 6,279,046 | B1 | 8/2001 | Armstrong et al. |
| 6,381,742 | B2 | 4/2002 | Forbes et al. |
| 6,418,460 | B1 | 7/2002 | Bitar et al. |
| 6,487,654 | B2 | 11/2002 | Dowling |
| 6,542,926 | B2 | 4/2003 | Zalewski et al. |
| 6,587,938 | B1 | 7/2003 | Eilert et al. |
| 6,598,069 | B1 | 7/2003 | Rooney et al. |
| 6,615,303 | B1 | 9/2003 | Endo et al. |
| 6,625,638 | B1 | 9/2003 | Kubala et al. |
| 6,647,508 | B2 | 11/2003 | Zalewski et al. |
| 6,711,605 | B2 | 3/2004 | Sekiguchi et al. |
| 6,760,783 | B1 | 7/2004 | Berry |
| 6,779,065 | B2 | 8/2004 | Murty et al. |
| 6,912,493 | B1 | 6/2005 | Scheel et al. |
| 6,957,435 | B2 * | 10/2005 | Armstrong et al. .......... 718/104 |
| 7,000,051 | B2 | 2/2006 | Armstrong et al. |
| 7,146,305 | B2 | 12/2006 | van der Made |
| 7,320,065 | B2 | 1/2008 | Gosior et al. |
| 2001/0014905 | A1 | 8/2001 | Onodera |
| 2003/0014466 | A1 | 1/2003 | Berger et al. |
| 2003/0101440 | A1 | 5/2003 | Hardin et al. |
| 2004/0205272 | A1 * | 10/2004 | Armstrong et al. .......... 710/260 |

FOREIGN PATENT DOCUMENTS

| | | |
|---|---|---|
| JP | 02-090331 | 3/1990 |
| JP | 07-160656 | 6/1995 |
| JP | 2001188685 | 7/2001 |

OTHER PUBLICATIONS

Renaud, David. The UT Virtual Machine Monitor. Systems Programming Laboratory Note 5. May 1978.*

Uhlig et al. Intel Virtualization Technology. IEEE Computer Society. May 2005.*

IBM Corporation, S/390 Processor Resource/Systems Manager Planning Guide (IBM Pub. No. GA22-7236-04, 5th Edition, Mar. 1999).

David L. Black, "Scheduling Support for Concurrency and Parallelism in the Mach Operating System," Computer, IEEE Computer Society, vol. 23, No. 5, May 1, 1990, pp. 35-43.

T. L. Borden et al., "Multiple Operating Systems on One Processor Complex," IBM Systems Journals, vol. 28, No. 1, 1989, pp. 104-122.

Shigekazu Inohara et al., "A Thread Facility Based on User/Kernel Cooperation in the XERO Operating System," Computer Software and Applications Conference, 1991, Sep. 11, 1991, pp. 398-405.

D. Menasce et al. "Capacity Planning and Performance Modeling", ISBN 0-13-035494-5, © 1994.

Leutenegger et al. "A Modeling Study of the TPC-C Benchmark", Proceeding of the 1993 ACM SIGMOD Int'l Conference on Management of Data, 1993, pp. 22-31.

C. Levine, "Order-of-Magnitude Advantage on TPC-C Through Massive Parallelism", Proceedings of the 1995 ACM SIGMOD Int'l Conference on Management of Data, 1995, pp. 464-465.

IBM Corporation, "AS/400 Logical Partitions Hardware Planning Guide", © 1999.

G. Schimunek et al. "Slicing the AS/400 With Logical Partitioning: A How to Guide", Aug. 1999.

IBM Corporation, "LPAR Configuration and Management" First Edition, © Apr. 2002.

Marisa Gil et al., "The Enhancement of a User-level Thread Package Scheduling on Multiprocessors," Sep. 1994, Euro-micro Workshop on Parallel and Distributed Processing, pp. 228-236.

Kaneda et al. A Virtual Machine Monitor for Providing a Single System Image. IPDPS Submission. 2006.

Scott et al. Multi-Model Parallel Programming in Psyche. Proceeding of the second ACM SIGPLAN symposium on Principles and practice of parallel programming. 1990.

Bakshi et al., "Partitioning and Pieplining for Performance-Constrained Hardware/Software System," 1999 IEEE, pp. 419-432.

Ayachi et al., "A Hierarchical Processor Scheduling Policy for Multiprocessor Systems," 1996 IEEE, pp. 100-109.

IBM AS/400e Logical Partitions: Learning About. (c) 1999, 2000. http://publib.boulder.ibm.com/pubs/html/as400/v4r5/ic2924/info/rzajx.pdf.

IBM AS/400e Logical Partitions: Planning for. (c) 1999, 2000. http://publib.boulder.ibm.com/pubs/html/as400/v4r5/ic2924/info/rzait.pdf.

IBM AS/400e Logical Partitions: Creating. (c) 1999, 2000. http://publib.boulder.ibm.com/pubs/html/as400/v4r5/ic2924/info/rzaj7.pdf.

IBM AS/400e Logical Partitions: Managing. (c) 1999, 2000. http://publib.boulder.ibm.com/pubs/html/as400/v4r5/ic2924/info/rzaj6.pdf.

IBM AS/400e Logical Partitions: Troubleshooting. (c) 1999, 2000. http://publib.boulder.ibm.com/pubs/html/as400/v4r5/ic2924/info/rzaj8.pdf.

* cited by examiner

VIRTUALIZATION OF A GLOBAL INTERRUPT QUEUE

CROSS-REFERENCE TO RELATED APPLICATIONS

This is a continuation of U.S. patent application Ser. No. 10/422,513 filed on Apr. 24, 2003, now U.S. Pat. No. 7,281,075 which is related to U.S. patent application Ser. No. 10/403,158, filed Mar. 31, 2003, entitled "Apparatus and Method for Virtualizing Interrupts in a Logically Partitioned Computer System" and U.S. patent application Ser. No. 09/838,057, filed Apr. 19, 2001, entitled "Method and Apparatus for Allocating Processor Resources in a Logically Partitioned Computer System", which are herein incorporated by reference in their entirety.

BACKGROUND OF THE INVENTION

1. Field of the Invention

The present invention generally relates to logically partitioned computer systems and more particularly to processing virtual interrupts targeting a logical partition.

2. Description of the Related Art

In a computing environment, parallel processing generally refers to performing multiple computing tasks in parallel. Traditionally, parallel processing required multiple computer systems, with the resources of each computer system dedicated to a specific task, or allocated to perform a portion of a common task. However, recent advances in computer hardware and software technologies have resulted in single computer systems capable of highly complex parallel processing, by logically partitioning the system resources to different tasks. In a logically partitioned computer system, available system resources are allocated among multiple logical partitions, each designed to appear to operate independently of the other. Management of the allocation of resources among logical partitions is typically accomplished via a layer of software components, commonly referred to as a partition manager.

An objective of the partition manager is to allow each logical partition to independently run software (e.g., operating systems and operating system-specific applications), typically developed to run on a dedicated computer system, with little or no modification. For example, one logical partition may be running a first operating system, such as IBM's OS/400, a second logical partition may be running a second operating system, such as IBM's AIX, while a third logical partition may be running a third operating system, such as Linux. By providing the ability to run multiple operating systems on the same computer system, a logically partitioned system may provide a user with a greater degree of freedom in choosing application programs best suited to the user's needs with little or no regard to the operating system for which an application program was written.

The partition manager typically accomplishes the objective of allowing each of the logical partitions to independently run software by presenting each logical partition with a set of virtual resources (software components) that operate, from the perspective of the logical partition, in an identical manner to corresponding hardware components. In other words, the partition manager may allow each logical partition to, in affect, operate as an independent virtual computer system (or virtual machine) with its own set of virtual resources.

The virtual resources presented to each logical partition may include one or more virtual processors. The virtual processors for each partition may share the processing resources of one or more physical processors assigned to the partition. To provide support for other types of virtual devices and to allow multiple operating systems to share a processor on a partitioned system, the virtual processor may be able to process virtual interrupts. In other words, a virtual interrupt may be generated by a virtual device, just as an actual hardware device may generate an interrupt on a physical processor, or may be generated as a result of an actual hardware interrupt re-routed from a different partition than the one running a virtual processor receiving the virtual interrupt. Concepts of creating virtual interrupts are described in detail in the commonly owned patent application Ser. No. 10/403,158, filed Mar. 31, 2003, entitled "Apparatus and Method for Virtualizing Interrupts in a Logically Partitioned Computer System," which is herein incorporated by reference.

Computer systems with multiple physical processors, such as logically partitioned computer systems, may utilize an interrupt management mechanism (commonly referred to as a global interrupt queue) that essentially designates which of the physical processors in the system may be the target of an interrupt by an I/O device. Upon receiving an interrupt, global interrupt queue hardware (and/or software) may choose one of the associated physical processors for presentation of the interrupt, thereby spreading the overhead of interrupt processing among multiple processors. In some instances, a global interrupt queue may be designed to present an interrupt to a selected one of the physical processors that is in an executing state more favorable to processing the interrupt than others. For example, other physical processors may be busy processing other partition tasks or may already be processing another interrupt (e.g., with a higher priority level).

As virtual processors are designed to behave in a similar manner to physical processors, a set of virtual processors assigned to a logical partition may also have executing states that are more favorable to processing virtual interrupts than others. To ensure an interrupt targeting the logical partition is handled as soon as possible, it would be desirable that the interrupt be presented to a virtual processor in the most favorable executing state. However, there is currently no mechanism (e.g., with functionality analogous to that of a global interrupt queue) for receiving a virtual interrupt and routing it to a virtual processor in an operating state most favorable for processing it.

Accordingly, there is a need for an improved method and system for processing virtual interrupts, for example, by implementing a virtual global interrupt queue configured to route virtual interrupts to virtual processors determined to be in operating states favorable for processing the virtual interrupts.

SUMMARY OF THE INVENTION

The present invention generally is directed to a method, article of manufacture, and system for processing a virtual interrupt.

One embodiment provides a method for processing a virtual interrupt. The method generally includes selecting one of a plurality of virtual processors for processing the virtual interrupt, based on operating states of at least one of the virtual processors and presenting the virtual interrupt to the selected virtual processor.

Another embodiment provides a method for selecting one of a plurality of virtual processors for presentation of a virtual interrupt. The method generally includes determining if any of the virtual processors is currently executing, if so, determining whether any executing virtual processor does not have a source of the virtual interrupt masked, and, if so, presenting the virtual interrupt to a virtual processor determined to be currently executing and to not have the virtual interrupt source masked.

Another embodiment provides a computer-readable medium containing a program for selecting one of a plurality of virtual processors for processing a virtual interrupt. When executed by a processor, the program performs operations generally including selecting, based on operating states of the virtual processors, one of the virtual processors for processing the virtual interrupt, and presenting the virtual interrupt to the selected virtual processor.

Another embodiment provides a logically partitioned computer system including at least one logical partition, a plurality of virtual processors associated with the logical partition, and a virtual global interrupt queue. The virtual global interrupt queue is generally configured to receive a virtual interrupt targeting the logical partition, select one of the virtual processors for processing the virtual interrupt based on operating states of at least one of the virtual processors, and present the virtual interrupt to the selected virtual processor.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention generally is directed to a method, system, and article of manufacture for processing virtual interrupts in a logically partitioned system. Embodiments provide and utilize an intelligent virtual global interrupt queue (virtual GIQ) that may be associated with a plurality of virtual processors running in a logical partition. Upon receiving a virtual interrupt, the virtual GIQ may examine the operating states of the associated virtual processors. In an effort to ensure the virtual interrupt is processed as quickly as possible, the virtual GIQ may present the virtual interrupt to one of the associated virtual processors in an operating state best suited for processing the virtual interrupt.

One embodiment of the invention is implemented as a program product for use with a computer system such as, for example, the logically partitioned computer system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications and the Internet.

Figure 1:
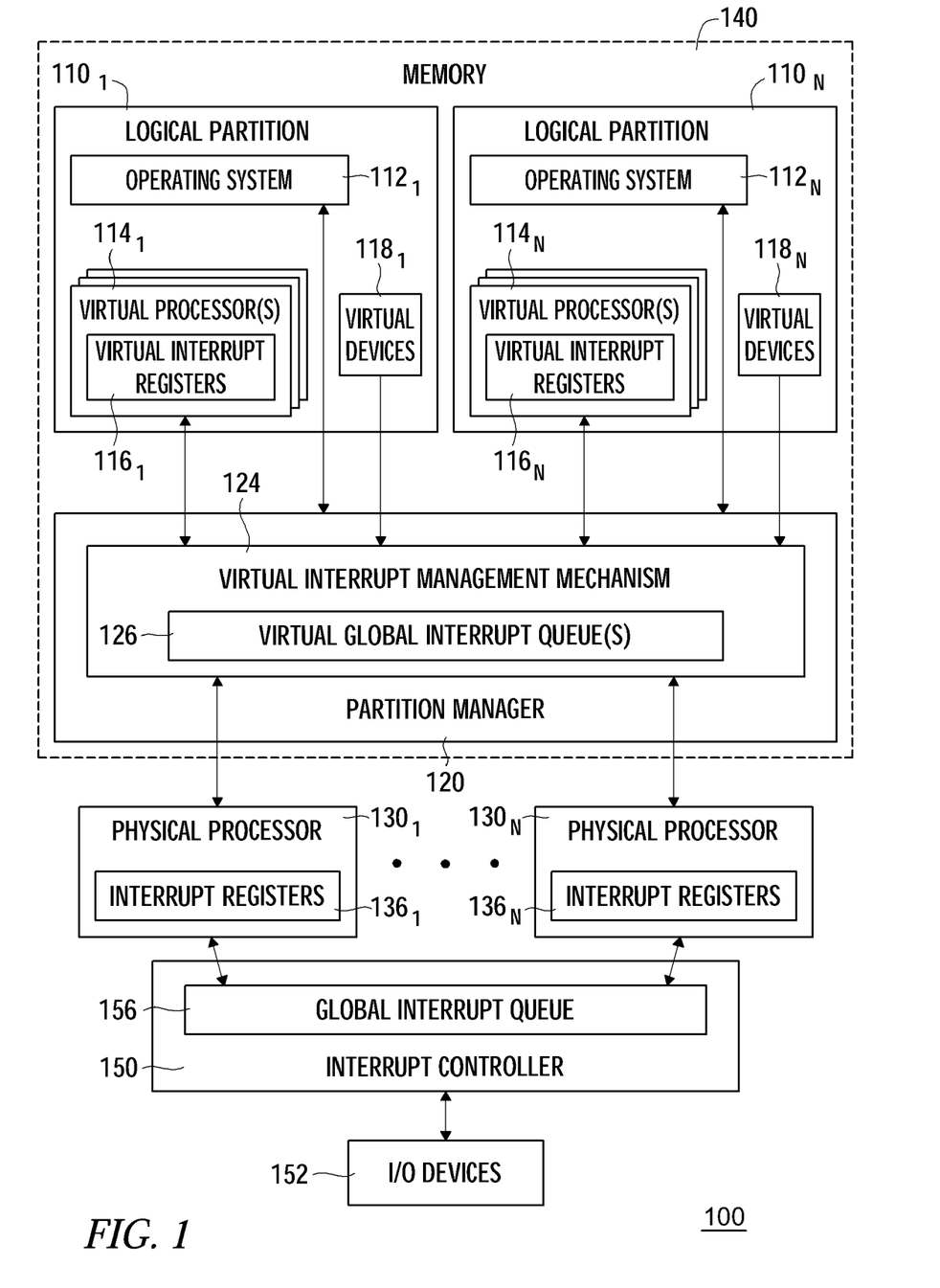
FIG. 1 is a logically partitioned computer system illustratively utilized in accordance with the present invention.

In general, the routines executed to implement the embodiments of the invention, may be part of an operating system or a specific application, component, program, module, object, or sequence of instructions, including, for example, firmware embodied as a virtual global interrupt queue 126 that may be a component of a virtual interrupt management mechanism 124 of a partition manager 120 of the logically partitioned computer system 100 shown in FIG. 1. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified or implied by such nomenclature.

An Exemplary Logically Partitioned System

FIG. 1 illustrates a logically partitioned computer system 100 having one or more logical partitions 110 (shown as logical partitions 110$_1$ through 110$_N$ to represent that any number N of logical partitions 110 may be supported). A partition manager 120 may generally control the creation and deletion of the logical partitions 110. Each logical partition 110 may have an associated operating system 112 running on one or more virtual processors 114 (which may share one or more physical processors 130). Concepts of virtual processors are described in detail in the commonly owned patent application Ser. No. 09/838,057 filed Oct. 24, 2002, entitled "Method and Apparatus for Allocating Processor Resources in a Logically Partitioned Computer System," which is herein incorporated by reference.

The computer system 100 may be any suitable type of computer system capable of supporting logical partitioning, such as a network server, mainframe computer, and the like. In one embodiment, the computer system 100 is an eServer iSeries computer system available from International Business Machines (IBM) of Armonk, N.Y. The computer system 100 generally includes one or more physical processors 130, coupled with memory 140. The system processors 130 may be allocated among the logical partitions 110 according to any suitable allocation arrangement.

For example, each logical partition 110 may have its own dedicated one or more of the system processors 130 or may share one or more of the system processors 130 with one or more other logical partitions 110. Each system processor 130 may run one or more of the virtual processors 114 of the logical partitions 110. The allocation of system processors 130, memory 140, as well as various other resources, such as I/O devices 152 (which may include a wide variety of I/O devices, as well as interface devices, such as I/O interfaces, storage interfaces, network interfaces, and the like) among the logical partitions 110 may be controlled by the partition manager 120.

As illustrated, the system 100 may include an interrupt controller 150 configured to receive interrupts generated by the I/O devices 152, and route the interrupts to one or more of the physical processors 130, as designated by the global interrupt queue 156. The partition manager 120 may include a virtual interrupt management mechanism 124 generally configured to receive interrupts from the physical processors 130 (e.g., as a result of I/O interrupts presented via the global interrupt queue 156) and route the interrupts to virtual processors 114 one of the logical partitions for processing.

The virtual interrupt management mechanism 124 may determine which of the logical partitions 110 is targeted by the interrupt, hiding such details from the physical processors 130. For example, the virtual interrupt management mechanism 124 may determine which logical partition 110 is targeted by the interrupt based on the interrupt source (e.g., as identified in an interrupt register 136 of the physical processors 130). In order to process the interrupt, a virtual interrupt may be presented to one of the virtual processors 114 running on the targeted logical partition 110. The virtual interrupt management mechanism 124 may also generate virtual interrupts in response to events occurring on one or more virtual devices 118.

Virtual Global Interrupt Queue

Figure 2A:
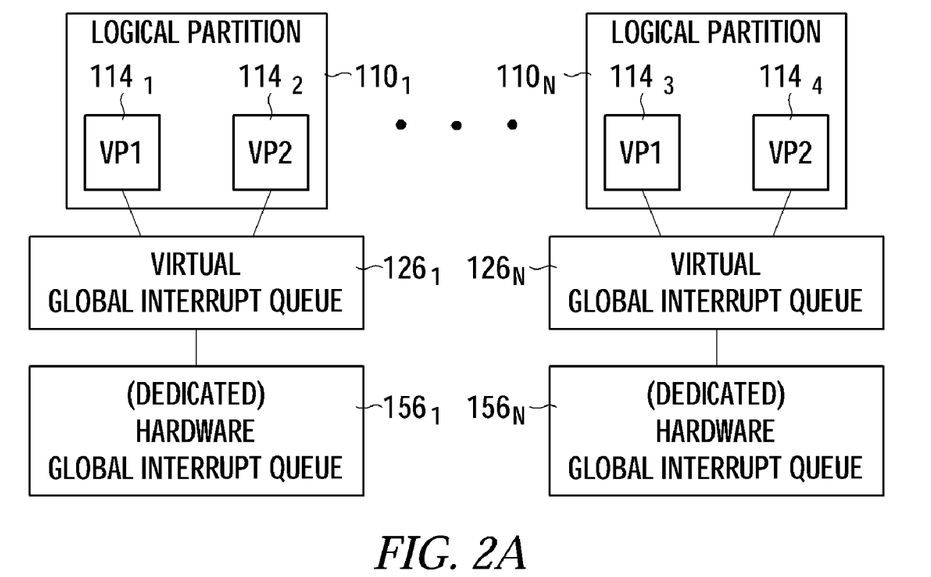
FIGS. 2A-C are a relational views of components in accordance with embodiments of the present invention.
Figure 2B:
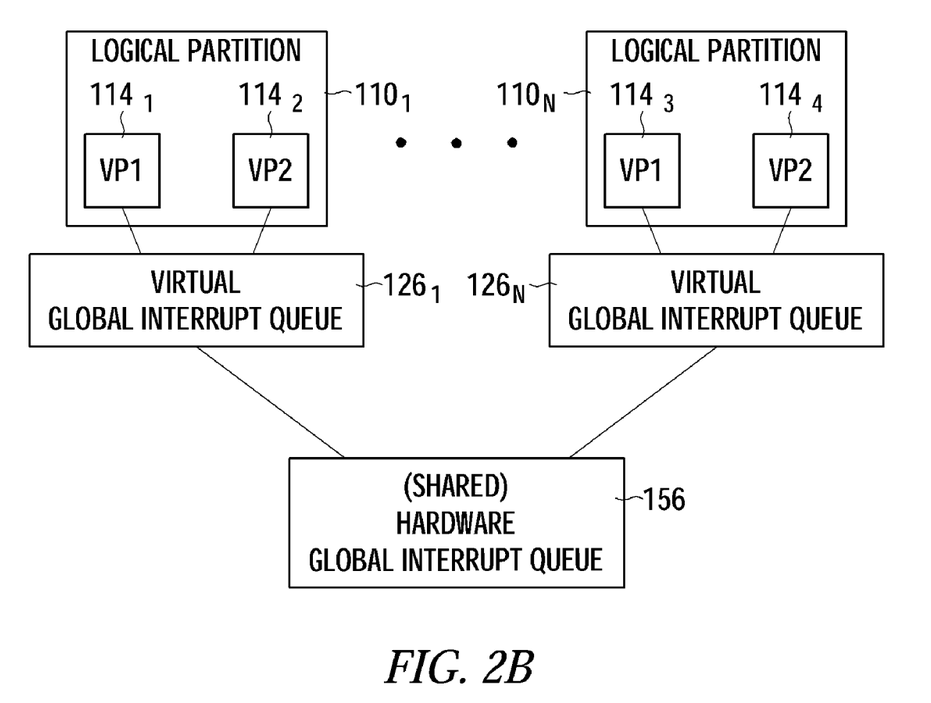

In either case, the virtual processors 114 available for presentation of the virtual interrupt may be designated by a virtual GIQ 126 associated with the targeted logical partition 110. It should be noted that logical partitions 110 may be running virtual processors 114 that are not assigned to a virtual GIQ 126, with the implication that such virtual processors 114 will not receive virtual interrupts via the virtual GIQ 126. However, such virtual processors 114 may still receive virtual interrupts specifically targeting them that are not sent through the GIQ 126. As illustrated in FIGS. 2A and 2B, each logical partition 110 may have its own virtual GIQ 126 (e.g., virtual GIQs $126_1$-$126_N$). Depending on the implementation, each virtual GIQ 126 may virtualize a hardware GIQ 156 dedicated to a corresponding logical partition 110, as shown in FIG. 2A, or the virtual GIQs 126 may collectively virtualize a hardware GIQ 156 shared among multiple logical partitions 110, as shown in FIG. 2B.

In either case, a virtual GIQ 126 may be generally configured to determine which of its associated virtual processors 114 is best suited to process the virtual interrupt based on their respective operating states. In making the determination, the virtual GIQ 126 may examine the operating states of its virtual processors 114 in order to establish whether one or more criteria favorable to processing a virtual interrupt have been satisfied. A variety of different operating state criteria may be applied to determine which virtual processor 114 is best suited to process a virtual interrupt, the particular details of which may vary with different embodiments.

Two examples of suitable criteria that may be applied when selecting a virtual processor for presentation of a virtual interrupt are whether the virtual processor is currently executing and whether the virtual processor has masked the source of the virtual interrupt, both of which may have an impact on how fast the virtual processor may process the virtual interrupt. For example, if a first virtual processor is not currently executing (e.g., the first processor has been pre-empted or yielded and a second virtual processor is executing), in order for the first virtual processor to process the virtual interrupt, the second virtual processor would have to first be pre-empted (e.g., its execution state saved, etc.) and there would be a delay while waiting for the second virtual processor to be dispatched. Whether a virtual processor is executing may be determined, for example, via a register in a control block (not shown) associated with the virtual processor.

Figure 2C:
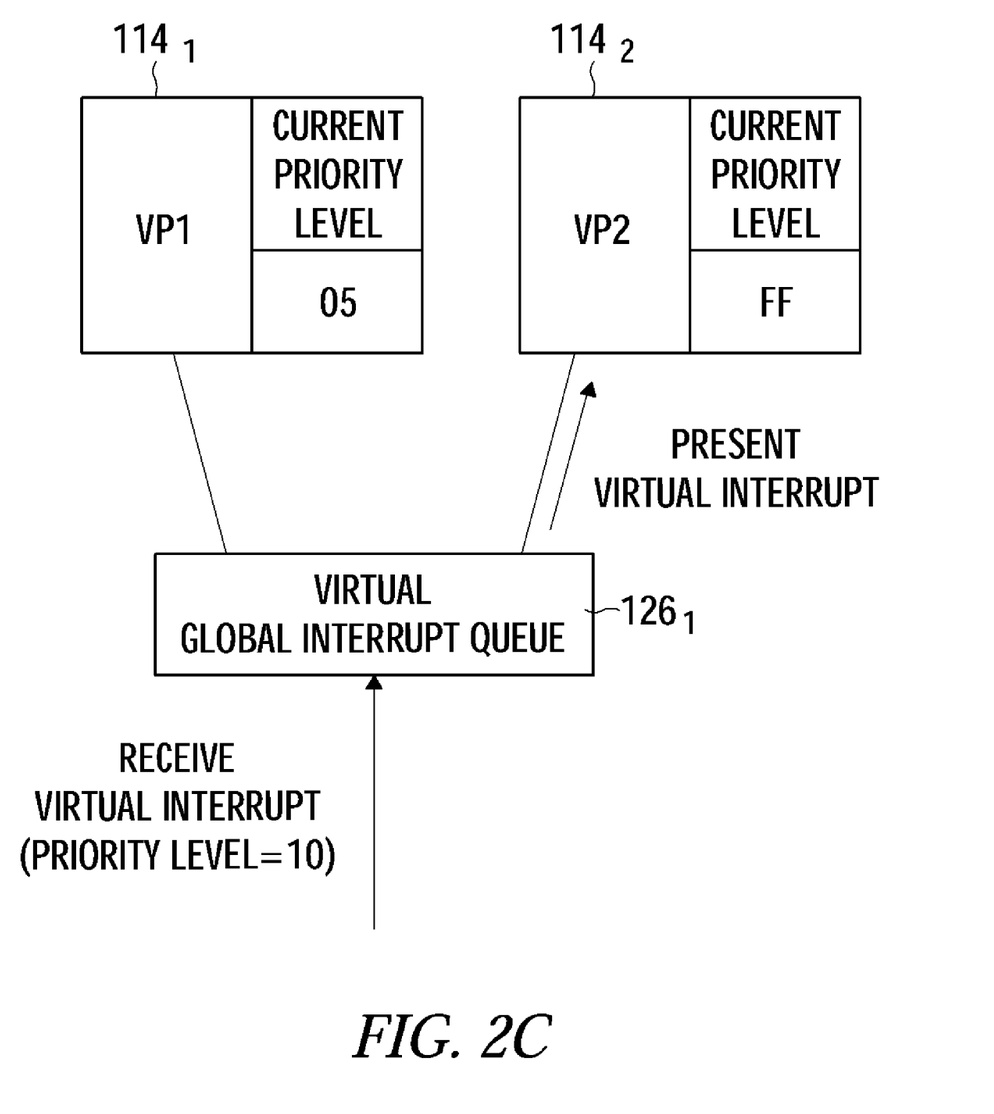

Delays in processing the virtual interrupt may also be encountered if the virtual interrupt is sent to a virtual processor that has masked the source of the virtual interrupt. The exact technique for interrupt masking may vary with different processors. One common technique is to maintain a current interrupt priority level, whereby only interrupts received that have a higher interrupt priority level are processed. The concept of interrupt masking via interrupt priority levels is illustrated in FIG. 2C that shows two virtual processors, VP1 $114_1$ and VP2 $114_2$, having current interrupt priority levels of '05' and 'FF' (e.g., hex 'FF'=decimal '255'), respectively, with 'FF' being the lowest possible priority level, such that VP2 is masking no interrupts are masked. It is assumed, for this example, that both virtual processors VP1 and VP2 are executing. Upon receiving a virtual interrupt having a priority level of '10' the virtual GIQ may determine that if presented to VP1, the virtual interrupt would not be processed (e.g., would be pending in VP1's interrupt queue) until VP1 has processed all currently pending interrupts having priority greater than '10.' On the other hand, having a current interrupt priority level of 'FF,' VP2 could process the virtual interrupt immediately. Therefore, the virtual GIQ 126 presents the virtual interrupt to VP2.

An Exemplary Method for Routing Virtual Interrupts

Figure 3:
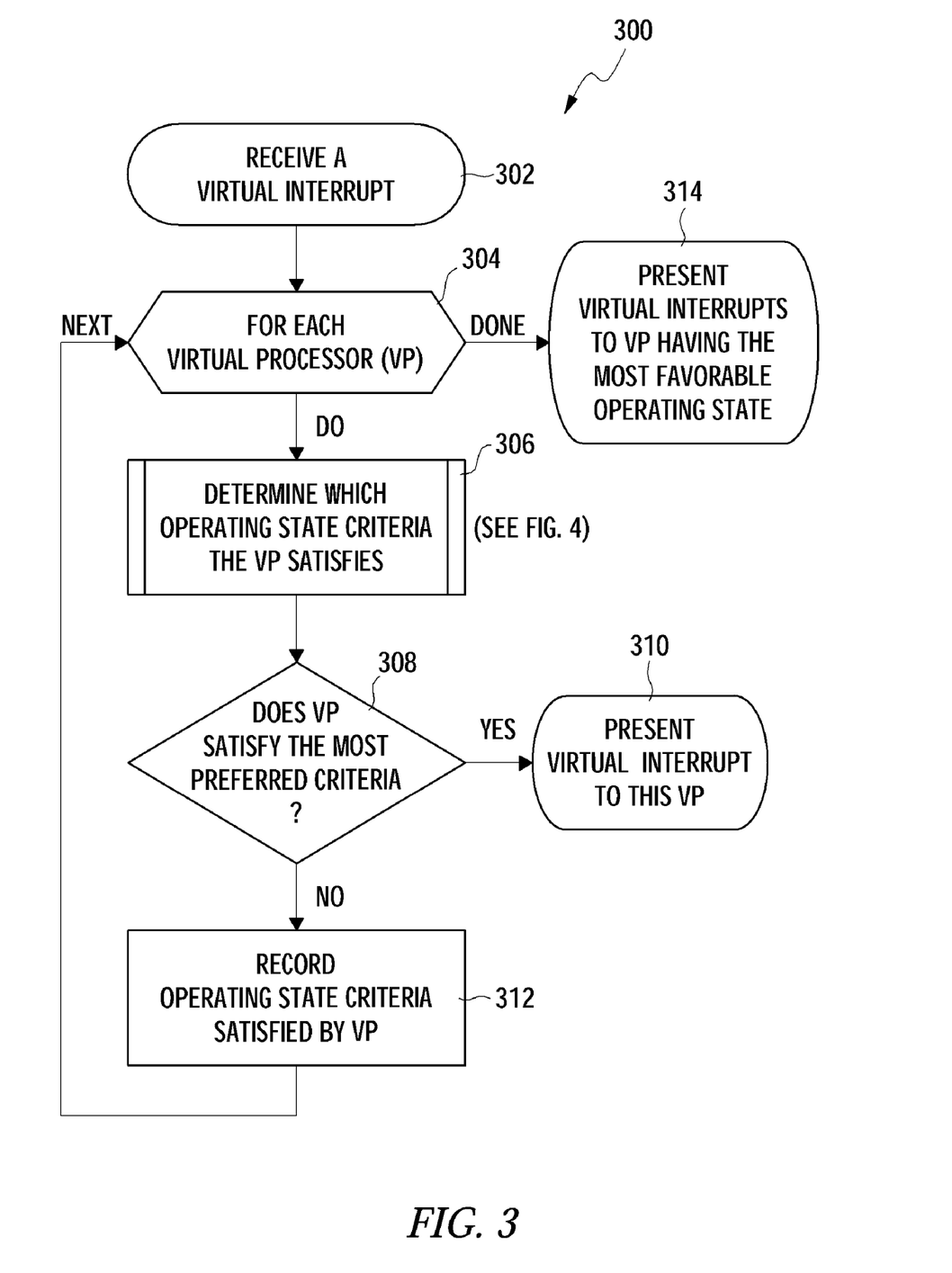
FIG. 3 is a flow chart illustrating exemplary operations for processing a virtual interrupt in accordance with an embodiment of the present invention.

FIG. 3 is a flow diagram that illustrates exemplary operations 300 that may be performed by a virtual GIQ 126, for example, to select a virtual processor best suited to process a virtual interrupt. The operations 300 begin at step 302, by receiving a virtual interrupt. As previously described, the virtual interrupt may be generated by a virtual device 118 on a partition (e.g., a software interrupt), or as a result of a hardware interrupt (e.g., from an I/O device 152). In either case, the virtual GIQ 126 attempts to determine which of its associated VPs are best suited to process the interrupt, for example, as previously described, by examining the operating state of each VP, in an effort to establish which VPs have satisfied of a set of criteria.

Therefore, at step 304, the virtual GIQ enters a loop of operations (306-312) to examine the operating state of each VP. At step 306, the virtual GIQ determines which operating state criteria the VP has met. For example, the virtual GIQ may call a routine that returns a value ($VP_{CRIT}$) indicative of which of a predetermined set of criteria has been satisfied by the VP, based on the VPs operating state. As previously described, the criteria may include any suitable set of criteria that may be indicative of the VPs ability to process an interrupt in a timely fashion, and any suitable algorithm may be utilized to assign a value to $VP_{CRIT}$ based on which criteria are met.

For example, using the exemplary criteria described above, a VP may be assigned one of four values for $VP_{CRIT}$ shown in TABLE I, below. As shown, a value

TABLE I

EXAMPLE VP CRITERIA

| | |
|---|---|
| $VP_{CRIT}$ = 1 | VP IS EXECUTING, INTERRUPT SOURCE IS NOT MASKED |
| $VP_{CRIT}$ = 2 | VP IS EXECUTING, INTERRUPT SOURCE IS MASKED |
| $VP_{CRIT}$ = 3 | VP IS NOT EXECUTING, INTERRUPT SOURCE IS NOT MASKED |

TABLE I-continued

EXAMPLE VP CRITERIA

Figure 4:
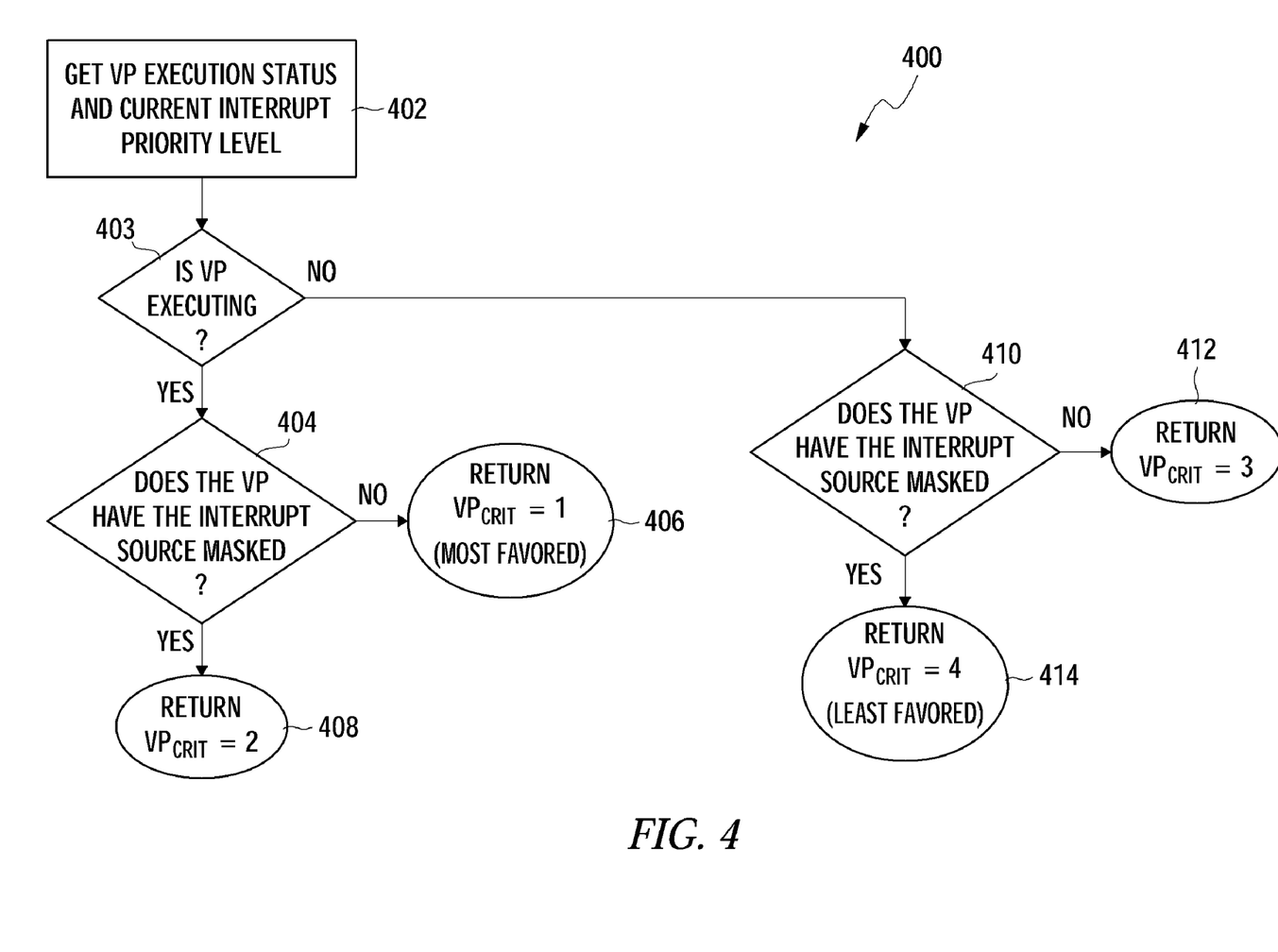
FIG. 4 is a flow chart illustrating exemplary operations for determining the operating state of a virtual processor in accordance with an embodiment of the present invention.

| | |
|---|---|
| $VP_{CRIT} = 4$ | VP IS NOT EXECUTING, INTERRUPT SOURCE IS MASKED | of 1 for $VP_{CRIT}$ may correspond to the most preferred operating state, while a value of 4 for $VP_{CRIT}$ may correspond to the least preferred operating state. FIG. 4 illustrates a method for applying the specific set of operating state criteria listed in TABLE I above and returning the illustrated values for $VP_{CRIT}$. The operations 400 begin, at step 402, by obtaining the execution status and current interrupt priority level of the selected virtual processor. For example, the virtual GIQ may read the current interrupt priority level from one of a set of virtual interrupt registers 116 associated with the virtual processor 114.

At step 404, a determination is made, as to whether the selected virtual processor is currently executing. If the selected virtual processor is executing, processing proceeds to step 403, where a determination is made as to whether the selected virtual processor has masked the virtual interrupt source. If the selected virtual processor has not masked the virtual interrupt source, a criteria level ($VP_{CRIT}$) of 1 may be returned, at step 406, in this example, indicating the most favorable operating state (e.g., the selected virtual processor should be able to process the virtual interrupt immediately). On the other hand, if the selected virtual processor has masked the virtual interrupt source, a $VP_{CRIT}$ of 2 may be returned, at step 408. If the selected virtual processor is not executing, processing proceeds to step 410, to determine if the virtual processor has masked the virtual interrupt source. If not, a $VP_{CRIT}$ of 3 may be returned, at step 412, or if the virtual processor has masked the virtual interrupt source, a $VP_{CRIT}$ of 4 is returned, at step 414.

Referring back to FIG. 3, if a selected virtual processor has the most favored operating state (e.g., $VP_{CRIT}=1$), as determined at step 308, there is no need to examine other virtual processors, as the currently selected virtual processor should be able to process the virtual interrupt immediately. Therefore, the virtual interrupt is presented to the selected virtual processor, at step 310. However, if the selected virtual processor has any operating state other than the most favorable (e.g., the virtual processor is not running or has masked the virtual interrupt source), the operating state is recorded, at step 312, for later comparisons. Processing then returns to step 304 to select the next virtual processor.

If none of the virtual processors is in the most favorable operating state, operations proceed to step 314, where the virtual interrupt is presented to the virtual processor having the most favorable operating state, relative to the other virtual processors. For example, the virtual GIQ may perform a simple routine to identify which virtual processor 114 has the lowest VPCRIT, as recorded at step 312, and present the virtual interrupt to the identified virtual processor 114. If more than one virtual processor has the same most favorable operating state (value of VPCRIT), the virtual GIQ 126 may arbitrarily present the virtual interrupt to either or perform arbitration, for example, considering other suitable criteria.

Of course, the operations 300 may be modified in various manners for different implementations. For example, rather than present the virtual interrupt to the virtual processor 114 having the most favorable operating state, the virtual GIQ 126 may require that a virtual processor 114 have met at least one of a set of criteria. For example, if none of the set of criteria are met, there may be no valid basis for predicting which of the virtual processors will be able to process the virtual interrupt first. Therefore, for some embodiments, if none of the virtual processors 114 associated with the virtual GIQ 126 have satisfied any of the criteria (e.g., none are executing and all have the virtual interrupt source masked), the virtual GIQ 126 may simply wait. For example, the virtual GIQ 126 may simply allow the virtual interrupt to remain pending until one of the associated virtual processors 114 satisfies at least one of the criteria.

CONCLUSION

Virtual interrupts are utilized to provide support for virtual devices and allow multiple operating systems to share physical processors in a logically partitioned computer system. By routing virtual interrupts to virtual processors that are in an optimal operating state for processing the virtual interrupts, embodiments of the present invention may ensure that virtual interrupts are processed in a timely manner.

While the foregoing is directed to embodiments of the present invention, other and further embodiments of the invention may be devised without departing from the basic scope thereof, and the scope thereof is determined by the claims that follow.

What is claimed is:

1. A computer-implemented method for processing a virtual interrupt, comprising:
   for each of a plurality of virtual processors, invoking a routine that returns a value indicative of a predetermined set of criteria that has been satisfied for a respective virtual processor;
   selecting one of the plurality of virtual processors for processing the virtual interrupt, based on values returned for the virtual processors that indicate the selected virtual processor may process the virtual interrupt with less delay than another one of the virtual processors; and
   presenting the virtual interrupt to the selected virtual processor.

2. The method of claim 1, wherein one of the predetermined set of criteria comprises whether the respective virtual processor is currently executing.

3. The method of claim 1, wherein the method further comprises:
   determining a source of the virtual interrupt; and
   wherein one of the predetermined set of criteria comprises whether the respective virtual processor has masked the source of the virtual interrupt.

4. The method of claim 3, further comprising presenting the virtual interrupt to the respective virtual processor if the respective virtual processor is executing and does not have the virtual interrupt source masked.

5. The method of claim 4, further comprising determining whether the respective virtual processor has the virtual interrupt source masked based on a virtual interrupt register associated with the respective virtual processor, the virtual interrupt register indicative of a current interrupt priority level of the respective virtual processor.

6. A computer-readable storage medium containing a program for selecting one of a plurality of virtual processors for processing a virtual interrupt which, when executed by a processor, performs operations comprising:
   for each of a plurality of virtual processors, invoking a routine that returns a value indicative of a predetermined set of criteria that has been satisfied for a respective virtual processor;

selecting, based on values returned for the virtual processors that indicate a first one of the virtual processors may process the virtual interrupt with less delay than another one of the virtual processors, the first one of the plurality of virtual processors for processing the virtual interrupt; and presenting the virtual interrupt to the selected first virtual processor.

7. The computer-readable storage medium of claim 6, wherein one of the predetermined set of criteria comprises whether the virtual processor is currently executing.

8. The computer-readable medium of claim 7, wherein the operations further comprise:

determining a source of the virtual interrupt; and wherein one of the predetermined set of criteria comprises whether the respective virtual processor has masked the source of the virtual interrupt.

9. The computer-readable storage medium of claim 6, wherein the operations comprise presenting the virtual interrupt to the respective virtual processor if the respective processor is executing and does not have the virtual interrupt source masked and one of the criteria comprises whether the respective virtual processor is currently executing.

* * * * *